United States Patent [19]

Pigott et al.

[11] Patent Number: 4,548,419

[45] Date of Patent: Oct. 22, 1985

[54] MOTORCYCLE SIDECAR

[76] Inventors: Keith R. Pigott, 2 Wayside Cottages, Long La.; Michael J. Macartney, 1 Wayside Cottages, Long La.; Alan S. Young, Boulac Cottage, Upper St., all of Southrepps, Norwich, Norfolk, England

[21] Appl. No.: 550,480

[22] Filed: Nov. 9, 1983

[30] Foreign Application Priority Data

Nov. 16, 1982 [GB] United Kingdom ............... 8232732

[51] Int. Cl.[4] ............................................ B62K 27/02
[52] U.S. Cl. .................................................. 280/203
[58] Field of Search ..................... 280/203; 180/219

[56] References Cited

U.S. PATENT DOCUMENTS

| | | | |
|---|---|---|---|
| 1,461,759 | 7/1923 | Johnston | 280/203 |
| 4,022,483 | 5/1977 | Wallick et al. | 280/203 |
| 4,073,503 | 2/1978 | Hokans | 280/203 |
| 4,477,097 | 10/1984 | Hayes | 280/203 |

FOREIGN PATENT DOCUMENTS

| | | | |
|---|---|---|---|
| 811524 | 4/1937 | France | 280/203 |
| 2269448 | 11/1975 | France | 280/203 |

Primary Examiner—John A. Pekar
Attorney, Agent, or Firm—Neal J. Mosely

[57] ABSTRACT

There is disclosed a motorcycle sidecar which has a single wheel on a king post, a load supporting tray which may optionally form a mudguard for the wheel, and a framework. The framework supports at least each end of the tray and consists of two vertically disposed parallelogram linkages between the motorcycle and the wheel. The top member of the front parallelogram linkage is connected to the top member of the rear one, as are the lower members and the king post is attached to these connecting members. When the motorcycle is leaned into a corner, the king post leans at a similar angle while the wheel remains on the ground and the tray remains substantially horizontal.

3 Claims, 2 Drawing Figures

U.S. Patent   Oct. 22, 1985   4,548,419
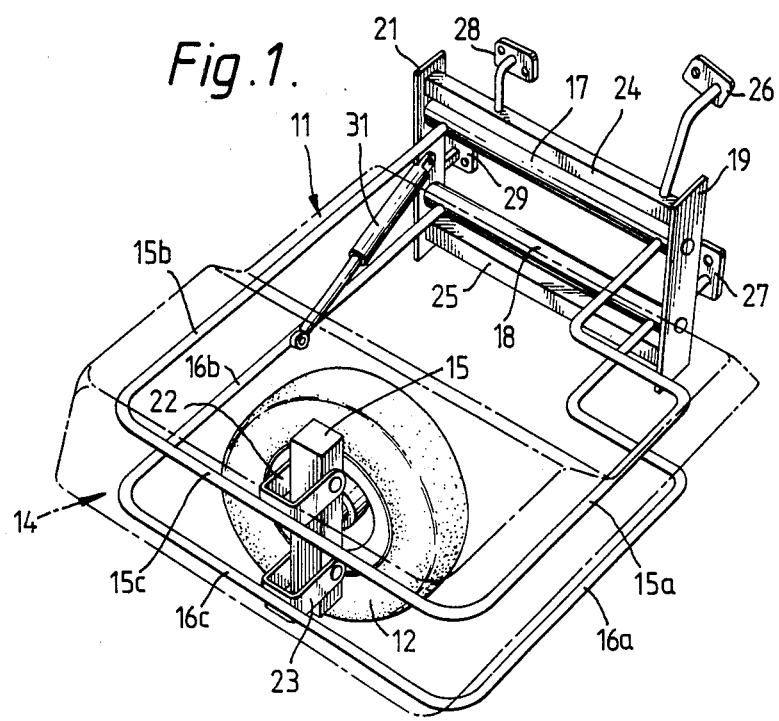
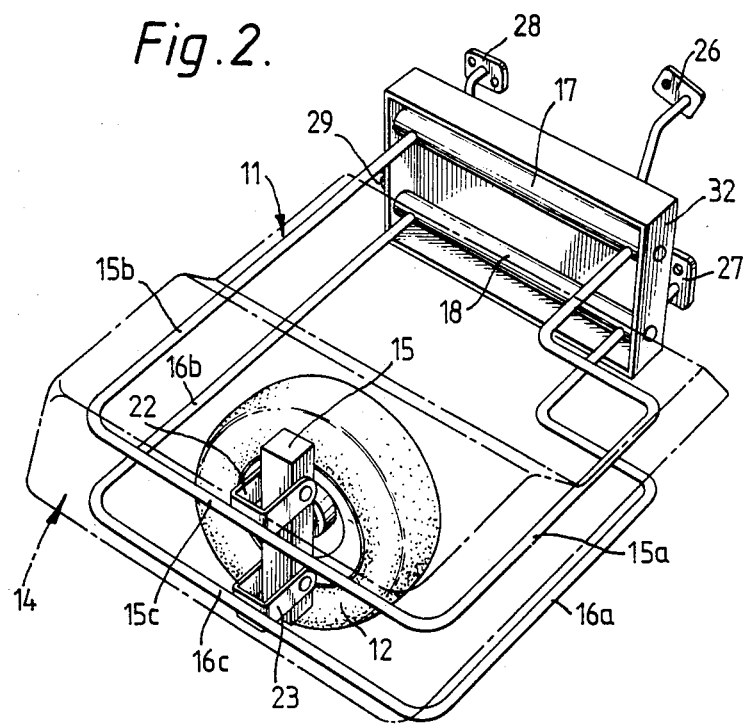

MOTORCYCLE SIDECAR

FIELD OF THE INVENTION

The invention relates to motorcycle sidecars.

Conventional motorcycle sidecars are attached to the motorcycle itself by a rigid framework. When cornering such a conventional motor cycle-and-sidecar combination, the rider has to lean his body into the corner to overcome the forces tending to lift the motorcycle about the sidecar. For this reason, sidecars have been developed which instead of using a rigid framework are attached to the motorcycle by a pivoted framework which forms, when the motor cycle-and-sidecar combination is viewed head-on, a deformable parallelogram linkage.

One such sidecar is shown in U.S. Pat. No. 4,022,483 (Wallick). Others have also been disclosed.

By using a deformable parallelogram linkage to attach the sidecar to the motorcycle, the natural tendency of the motorcycle rider to lean his machine, rather than his body, into a corner, can be safely followed; because, as the machine leans over into the corner, the deforming linkage automatically leans the sidecar wheel as well, and so the forces which normally have to be overcome with a conventional rigidly-attached sidecar do not arise.

The Wallick arrangement referred to above is one of the latest in a series of developments of this "tilting sidecar" concept. In the Wallick patent, the sidecar frame is attached at its front end by a deformable parallelogram linkage to the main motorcycle frame members. At its back end, however, it uses a relatively complex track-and-follower coupling to give the sidecar a semi-independent back-end movement whilst still linking it to the motorcycle frame. To aid this semi-independent form of rear suspension of the sidecar, the sidecar wheel in the Wallick arrangement is trailed out behind the main part of the sidecar frame. In the particular arrangement illustrated in the Wallick patent, the sidecar wheel is also an inboard wheel—in other words, the wheel is between the sidecar body and the motorcycle frame, whereas conventionally the sidecar body lies between the sidecar wheel and the motorcycle frame.

Motor cycle-and-sidecar combinations embodying the Wallick invention have worked in practice, but they require relatively sophisticated engineering because of the unorthodox nature of the design. They are also intended specifically for passenger-carrying use. For both these reasons, they tend to be expensive, even when compared with the nowadays high price of a modern solo motorcycle. For these and other reasons they have not, as far as is known, achieved any really widespread popularity.

SUMMARY OF THE INVENTION

The present invention is based on the deformable-parallelogram-frame concept of attaching a sidecar to a motorcycle, but is especially applicable to small sidecars intended for load-carrying but not necessarily passenger-carrying use. It differs in a number of novel and non-obvious ways from the Wallick construction reviewed above.

According to the broadest aspect of the present invention, a motorcycle sidecar comprises a wheel, a load supporting tray and a framework comprising two substantially vertically disposed parallelogram linkages, each linkage connecting the wheel with the motorcycle and each arranged to support a respective end zone of said tray.

Preferably the linkages are pivoted to subframe means adapted for rigid but readily detachable connection to said motorcycle.

In another broad aspect of the invention, the links which form the top and bottom links of the sidecar-attaching frame, when the motor cycle-and-sidecar combination is viewed from the front end or from the back end, continue along the outboard side of the sidecar so that the top link of the front parallelogram is joined to the corresponding top link of the back parallelogram, and the bottom links of the two parallelograms are similarly joined.

Such a construction is rigid, relatively cheaply produced, and lends itself ideally to an arrangement in which the side rails joining the top and the bottom links run outboard of the sidecar wheel to protect the wheel from side impact and to minimise the width of the sidecar.

The side-rail-linked arrangement just outlined also lends itself ideally to supporting load-carrying part of the sidecar body. Such a load-carrying part of the body is hereinafter referred to as a tray, which term shall include trays and enclosed boxes. The respective front and back links, and their joining side-rails can be generally U-shaped when viewed from above, and a generally rectangular tray can be detachably clipped or otherwise secured to the top one of those U-shaped rail members.

If the sidecar wheel is mounted inboard of the link-joining side-rails, part of the tray then forms a mudguard for the wheel. The tray can be specially contoured to incorporate such a mudguard, without a separate mudguard having to project from the side of the sidecar body as it would do if the wheel were in its conventional position outboard of the body.

According to a further aspect of the invention, there is provided a motorcycle sidecar comprising fastening means detachably fixable to said motorcycle, an upper link means and a lower link means each consisting of an elongate forward member and an elongate rear member, each of said members being pivotally connected at one of their ends to said fastening means, and a coupling member joining together the other ends of the forward and rear members, post means pivotally connected to said upper link means and said lower link means at a location remote from said fastening means, rotatable wheel means attached to said post means.

Preferably said upper and lower coupling members are disposed outwardly of said wheel means, and a load-carrying tray is removably attachable to said upper link means.

Advantageously the spacing between said pivotable connections at said fastening means is substantially identical to the spacing between said pivotable connections at said post means, so that said upper means is substantially parallel to said lower link means.

In the prior-art Wallick arrangement outlined previously, the respective front and back sidecar-attaching linkages are mounted to parts of the motorcycle which have to be specially fitted and positioned to take the inboard ends of these links. With the sidecar removed, the link-receiving parts remain. These link-receiving parts incorporate connections involving pivots, and may be unsightly in the eyes of the motorcycle owner when he is not using his sidecar. The sidecar linkages themselves will collapse when the sidecar is removed from the motorcycle, and this may make the sidecar difficult to store and manhandle and may cause the unsupported links to be bent or otherwise damaged.

It is therefore provided that the parallelogram linkages are pivoted to a sub-frame which forms, when the motorcycle-and-sidecar combination is viewed head-on, the inboard one of the two opposite-end uprights of the linkages and the sub-frame is designed for rigid but readily detachable connection to the motorcycle.

With such an arrangement, the necessary inboard linkage pivots are incorporated into the sub-frame, and the means of attachment to the motorcycle itself need comprise only rigid mountings which need not detract from the appearance of the motorcycle when it is being used "solo" and which, indeed, need not remain on the motorcycle at all if the sub-frame is rigidly clipped to the tubes of the motorcycle frame and the clips come away with the sub-frame when the sub-frame is detached.

In a similar, but still independent, further aspect of the invention, a sub-frame carrying the inboard ends of the top and bottom links of the deformable parallelogram linkages forms a rigid extension of, or is designed to be rigidly connected to, a footrest or both footrests of the sidecar-supporting side of the motorcycle. Where the invention is embodied in relatively small-load carriers, the sidecar will be light in weight, and the footrests form ideal points of attachment.

The prior art Wallick arrangement incorporates a fluid-cushioned shock-absorbing ram in its linkage. This ram runs along the sidecar frame. Its main function is to accommodate up-and-down movement of the sidecar wheel. A sidecar embodying the present invention may also optionally incorporate a fluid-cushioned shock-absorbing ram; but the ram is preferably so connected that it cushions the deforming action of the sidecar-attaching linkages and runs in line with those linkages (ie. across the sidecar) rather than along the sidecar.

The sidecar-attaching linkage may incorporate means to lock it selectively in a position in which the sidecar and the motorcycle are both upright. It is then not necessary to use the motorcycle sidestand to balance the motor cycle-and-sidecar combination upright when it is stationary and its rider is not sitting on it.

Where the linkage incorporates a ram as just outlined, the ram could incorporate means to lock it in such a way that effectively braces the linkage and so fulfils the upright-maintaining role just outlined.

In any sidecar embodying the invention, the so-called "parallelogram linkage" may be a four-bar deformable linkage which is not a mathematically strict parallelogram. For example, such a linkage may be configured so that the sidecar leans more than the motorcycle, or vice versa, when the motor cycle-and-sidecar combination is cornered.

BRIEF DESCRIPTION OF THE DRAWINGS

Sidecars embodying the invention are shown in the accompanying drawings. They will now be described with reference to the drawings. They show two variants of one form which the invention might take, but it is currently the best way known to the applicants of putting the invention into practice. In the drawings:

FIG. 1 shows a perspective view of one embodiment of sidecar; and

FIG. 2 shows a variant of the embodiment shown in FIG. 1.

As shown in the drawing, the sidecar consists essentially of respective front and back deformable parallelogram linkages whose inboard ends are pivoted to a sub-frame and whose outboard ends carry and are pivoted to the kingpin about which the sidecar wheel rotates freely. The sub-frame is adapted for rigid but readily detachable connection to the frame of a solo motorcycle, not itself shown in the drawing. A tray or lidded box fits over the sidecar framework to provide a load-carrying platform. The sidecar is fitted with indicator lights, rear lights, and reflectors, as required to satisfy various legal requirements; although none of these accessories are shown in the drawing.

The tray is referenced 11 and is shown in chain line in the drawing. It is a fibreglass-reinforced moulding which is essentially square when viewed from above and which has flanged sides. It is referenced 11 in the drawing. As stated above, it may be replaced by an enclosed container, the underside of which is configured similarly to that of the tray. Herein, the word tray will be used to cover all such variants. The outboard longitudinal side region of the tray is raised out of the general plane of the rest of the tray, to clear the sidecar wheel 12 and its supporting kingpin 13. The outboard edge 14 of the tray is especially deeply flanged in consequence, as the bottom peripheral edge of the tray occupies substantially the same plane all the way round its circumference. The top regions of the tray are ribbed, as partly shown in the drawing, to constitute load-carrying surfaces and to reinforce to some extent the fibreglass-reinforced plastics tray from flexing unduly.

The tray II is clipped firmly but detachably to a top rail 15 of the sidecar framework. This top rail 15 is generally U-shaped when viewed from above. It consists of respective front and back top links 15a, 15b joined at their outer ends by a longitudinal rail 15c. In the construction illustrated, the rail 15 is formed from a single integral length of circular-section steel tubing.

A geometrically identical bottom rail 16 is positioned beneath the top rail 15 so that the top rail 15 exactly overlies the bottom rail 16 when the sidecar framework is viewed from above with the sidecar wheel 12 upright. The inboard ends of the two rails 15, 16 are welded to respective circular-section tubes 17, 18 each of which is pivoted at its opposite ends to two spaced-apart uprights 19, 21. The outboard side-rail lengths of the two rails 15, 16 have respective U-shaped brackets 22, 23 welded to them. Those brackets are pivoted to the wheel kingpin 13.

Square-section tubes 24, 25 span the gap between the uprights 19, 21 respectively above the tube 17 and below the tube 18. The tubes 17, 18, 24, 25 run parallel with one another when viewed from the side and are vertically in line when viewed end-on. The wheel kingpin 13 is parallel with the uprights 19, 21; and the rails 15, 16 are also parallel to one another. When the framework deforms about its pivots, the parallelism of those members is substantially maintained.

Short rigid tubes 26, 27, 28, 29 are welded to the square-section tubes 24, 25 of the sub-frame 19, 21, 24, 25. These short rigid tubes project inboard from the sub-frame tubes to which they are rigidly welded. One of the tubes 29 is square-section. The three others are each circular-section tubes. The inboard end of each tube carries a plate which is drilled to accept a bolt-on clamp; the clamps are not illustrated.

A fluid-cushioned shock-absorber 31 acts between the upright 21 of the sub-frame and the bottom rail 16.

It cushions the deforming movement of the sidecar framework about its pivots.

The variant shown in FIG. 2 differs from that so far described in that uprights 19, 21 and square-section tubes 24, 25 are replaced by a pressed steel plate 32. The circular-section tubes 17, 18 are pivotable in holes in vertical flanges of the plate 32 and stiffening is provided by the horizontal flanges. The plate 32 is easier to make than the four part framework of the variant shown in FIG. 1 and also enables more variation in the placing of the short rigid tubes 26, 27, 28 and 29 which connect the framework to the motorcycle. The positions of the fixing points vary from motorcycle to motorcycle and it is often more convenient to be able to attach one or more of the tubes 26, 27, 28 or 29 in a central zone of the plate 32 rather than at an edge of the rectangular framework.

Another way in which the two variants differ is that the fluid-cushioned shock-absorber 31 is not present in the variant of FIG. 2. It has been found in some cases that the shock-absorber 31, by introducing a delay between the motorcycle leaning and the parallelogram linkage following it, may cause unpredictable handling behaviour since the weight of the sidecar may be, for short periods when the motorcycle wheel 12 is clear of the ground, taken entirely by the motorcycle.

In use, the sidecar is bolted to the framework of the solo motorcycle via the clamps which attach to the drilled end-plates carried by the tubes 27 to 29. The end-plate of tube 26 fixes to the top of the rear shock-absorber of the solo machine. The remaining end-plates clamp to suitable parts of the motor cycle framework. The front of the sidecar sub-frame is just behind the front footrest (not shown) of the motorcycle.

In use, as the motorcycle is leaned into and out of a corner, the sidecar framework will tilt the wheel-supporting kingpin 13 to reproduce that leaning movement. The tray II will remain substantially level during normal angles of lean. Because the framework-mounting tubes, and the sub-frame, are short and rigid, any vibration is minimised and the transmission of vibration to the motor cycle frame is similarly minimised. The square-section bars used at various points help to achieve this. Also, because the side car is mounted to the side-frame members of the motorcycle, there is not the tendency for the sidecar frame to pull the steering head of the motorcycle round as in prior arrangements which tie the sidecar to the front of the motorcycle.

As the motorcycle leans over into a corner, the sub-frame 19, 21, 24, 25 or plate 32 will rise and will tend to pull the wheel 12 in towards the motorcycle. This "scrubbing" of the wheel could affect the handling adversely. For that reason, the wheel 12 is mounted inboard of the side-rails 15c, 16c. Ideally the centreline of the wheel 12 should be as far inboard from the rails 15c, 16c as the pivots of the tubes 17, 18 are outboard of the vertical centreline of the motorcycle. In practice, this would disturb the load-carrying area of the tray II, and so a compromise is reached which partly overcomes the tendency to "scrub" whilst leaving a substantially uninterrupted and fair-sized main load-carrying area on the ribbed tray II.

Whether or not the shock-absorber 31 is present a rigid strut (not shown) could be provided to clip between the rails 15b, 16b (and/or 15a, 16a) to effectively lock the deformable sidecar frame and balance the sidecar and the solo motorcycle upright. Such a strut could swing out of place, and be clipped safely out of place along one or other of the two rails, when the motor cycle-and-sidecar combination was being ridden normally.

Instead of fixing to the top of the rear shock-absorber of the solo machine, the end-plate of tube 26 could attach to the rack mounting which is often provided nowadays on solo motorcycles.

The linkage-locking strut outlined in the last paragraph but one could be adapted to lock the linkage and balance the sidecar and motorcycle upright, for riding in the manner of a conventional motorcycle-and-sidecar combination. This could have advantages for example in winter when riding conditions are more dangerous with the tilting combination.

I claim:

1. A motorcycle sidecar including fastening means detachably fixable to said motorcycle;
    an upper link means and a lower link means each consisting of an elongate forward member and an elongate rear member, each of said members being pivotally connected at one of their ends to said fastening means, and a coupling member joining together the other ends of the forward and rear members;
    post means pivotally connected to said upper link means and said lower link means at a location remote from said fastening means; and
    rotatable wheel means attached to said post means,
    said upper and lower coupling members being disposed outwardly of said wheel means.

2. A motorcycle sidecar according to claim 1, further including a load carrying tray means removably attachable to said upper link means.

3. A motorcycle sidecar according to claim 2, wherein said tray means includes a portion acting as mudguard means for said wheel means.

* * * * *